United States Patent
Kamiya et al.

(10) Patent No.: US 6,988,595 B2
(45) Date of Patent: Jan. 24, 2006

(54) VEHICULAR BRAKING APPARATUS AND METHOD

(75) Inventors: Masahiko Kamiya, Kariya (JP); Hiroshi Kondo, Kariya (JP); Shin Sasaki, Kariya (JP); Daizo Oba, Kariya (JP)

(73) Assignee: Advics Co., Ltd., Aichi-pref. (JP)

( * ) Notice: Subject to any disclaimer, the term of this patent is extended or adjusted under 35 U.S.C. 154(b) by 0 days.

(21) Appl. No.: 10/771,459

(22) Filed: Feb. 5, 2004

(65) Prior Publication Data

US 2004/0182657 A1   Sep. 23, 2004

(30) Foreign Application Priority Data

Mar. 19, 2003  (JP)  ............................. 2003-075817

(51) Int. Cl.
  *F16D 55/08*  (2006.01)

(52) U.S. Cl. .................. 188/72.1; 188/73.35; 188/162; 188/158; 303/191; 310/77

(58) Field of Classification Search ...... 188/72.1–72.8, 188/158–162, 1.11 E, 181 T, 218 A, 73.35–73.37; 303/20, 155, 115.2, 112, 3, 191; 318/362, 318/254, 611, 139; 701/70, 80; 310/77
See application file for complete search history.

(56) References Cited

U.S. PATENT DOCUMENTS

| | | | |
|---|---|---|---|
| 6,047,794 A | * | 4/2000 | Nishizawa ............... 188/73.36 |
| 6,679,355 B2 | * | 1/2004 | Suzuki ..................... 188/71.9 |
| 2004/0011603 A1 | * | 1/2004 | Yokoyama et al. ........ 188/72.7 |
| 2004/0182657 A1 | * | 9/2004 | Kamiya et al. ............ 188/72.1 |

FOREIGN PATENT DOCUMENTS

JP   A-2000-283193   10/2000

OTHER PUBLICATIONS

MAT(machine assisted translation) of JP-2000-283193-A obtained from the USPTO's STIC.*

* cited by examiner

*Primary Examiner*—Matthew C. Graham
*Assistant Examiner*—Mariano Sy
(74) *Attorney, Agent, or Firm*—Posz Law Group, PLC

(57) ABSTRACT

A braking force is generated by using a rotation of an electric motor to move a piston, which presses friction members onto a rotor. The displacement of the piston is controlled such that a detection value of a resolver becomes a target value. In the case of brake noise due to vibration of the rotor, the displacement of the friction members with respect to the rotor fluctuates in connection with the rotation of the rotor, leading to fluctuations in a rotational amount of the electric motor. Therefore, in a simple method and apparatus, brake noise can be detected based upon the magnitude of the fluctuation amount in the detection value of the resolver.

12 Claims, 4 Drawing Sheets

VEHICULAR BRAKING APPARATUS AND METHOD

CROSS REFERENCE TO RELATED APPLICATION

This application is based upon and claims the benefit of Japanese Patent Application No.2003-075817 filed on Mar. 19, 2003, the content of which are incorporated herein by reference.

FIELD OF THE INVENTION

The present invention relates to a vehicular braking apparatus.

BACKGROUND OF THE INVENTION

Conventionally, as an electrically operated braking apparatus, an art (refer to Japanese Patent No. 2000-283193 for an example) is utilized in which a brake torque or a pressing force by a caliper is directly detected by a sensor, and a fluctuation frequency of the detected torque or force is found and used to detect the occurrence of an abnormal vibration.

However, a particular sensor, i.e., a brake torque sensor or a load sensor, is necessary to detect the abnormal vibration in the above related art, which leads to not only higher costs, but also a more complicated configuration of the braking apparatus itself in order to accommodate such sensors.

SUMMARY OF THE INVENTION

In light of the above consideration, it is an object of the present invention to detect brake noise and abnormal vibration with a simple configuration and method.

In order to achieve the above object, according to a first aspect of the present invention, a fluctuation amount of a rotational amount of an electric motor is calculated by a rotation fluctuation calculating portion, and a vibration suppressing control is executed by a vibration suppressing control portion when the rotation fluctuation amount exceeds a predetermined value.

When brake noise and abnormal vibration occurs in the braking apparatus, the relative positions of the friction members, which are contacted with the rotor because the rotor strongly vibrates, change with respect to the rotor. Thus, a rotational axis of the electric motor, which presses the friction members toward the rotor, also moves back and forth in the pressing direction.

Therefore, according to the first aspect of the present invention, the occurrence of abnormal vibration and brake noise in the brake can be detected based upon the magnitude of a fluctuation in a rotational amount of the electric motor, which drives the friction members in the direction of the rotor integrally rotating with the wheel.

Consequently, a rotational amount of the electric motor used in a position control of the friction members in a normal brake device can also be used in the detection of brake noise and abnormal vibration, which allows for a simpler construction.

According to a second aspect of the present invention, a proportionality relation between a rotation cycle of the wheel calculated from a wheel speed and a rotation fluctuation cycle calculated from the rotational amount of the electric motor leads to the conclusion that the rotation fluctuation of the electric motor is caused by vibration of the rotor, which allows for more increased accuracy in the detection of brake noise and the like caused by the rotation fluctuation amount of the electric motor.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

Figure 1:
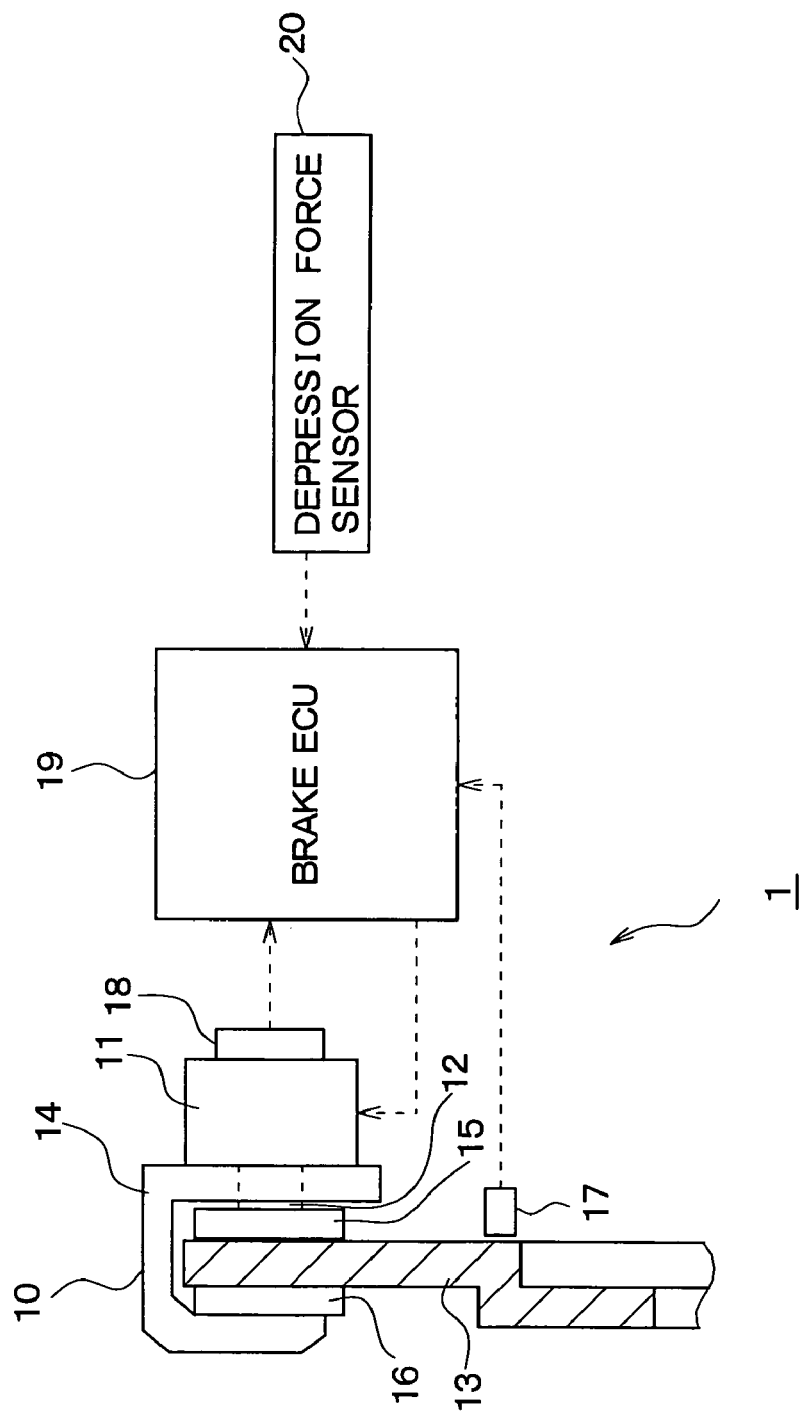
FIG. 1 shows a configuration according to an embodiment of the present invention.

The present invention will be described further with reference to various embodiments in the drawings.

Hereinafter, an embodiment of the present invention will be described with reference to the accompanying drawings. FIG. 1 shows a configuration of a vehicular braking apparatus according to the embodiment. A vehicular braking apparatus 1 is provided with an electric brake device 10 for each wheel. The electric brake device 10 includes a friction member 15 and a friction member 16 respectively provided on movable and fixed sides of a caliper 14 sandwiching a rotor 13 that integrally rotates with a wheel; a wheel speed sensor 17 for detecting a rotational speed of the rotor 13, that is, a wheel speed; a piston 12 that moves the friction member 15 in a direction substantially perpendicular to the surface of the rotor 13 and presses the friction member 15 on the rotor 13; an electric motor 11 that moves the piston 12 in a right or left direction using a ball screw (not shown); and a resolver 18 serving as a rotation detecting mechanism for detecting a rotational amount of the electric motor 11.

Furthermore, the vehicular braking apparatus 1 includes a brake ECU 19 serving as a drive control portion, and a depression force sensor 20 for detecting a depression force on a brake pedal (not shown) is connected to the brake ECU 19.

The brake ECU 19 is structured from a microcomputer, and controls and drives the electric motor 11 according to a control program stored in advance. Specifically, the brake ECU 19 feeds back an output signal from the resolver 18 to determine a drive current, using a displacement amount as a target value predetermined in accordance with a depression force value detected by the depression force sensor 20 such that a pressing force equivalent to the depression force is generated. The brake ECU 19 drives the electric motor 11 with the drive current. Note that during ABS control, the brake ECU 19 drives the electric motor 11 and appropriately increases, maintains and decreases the pressure of the braking force based upon detection values of the wheel speed sensor 17 and a vehicle speed sensor (not shown).

In addition, the brake ECU 19 serves as a rotation fluctuation calculating portion to calculate a rotation fluctuation amount and a rotation fluctuation cycle of the electric motor 11, and a rotation fluctuation cycle of the rotor 13 integrally rotating with the wheel.

Figure 2A:
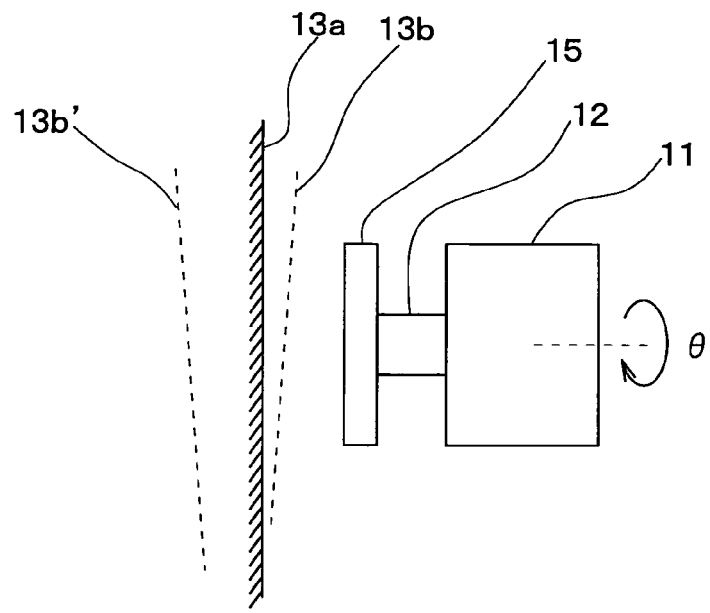
FIGS. 2A and 2B shows a relation between a vibration of a rotor and a contact state of the rotor with a friction member.
Figure 2B:
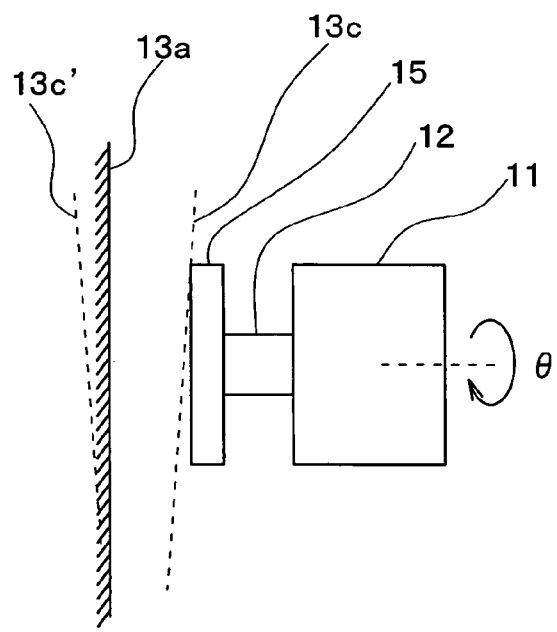

Hereinafter, a relation between the vibration of the rotor 13 and the friction member 15 will be described with reference to FIGS. 2A and 2B. FIGS. 2A and 2B show a positional relation between contact surfaces of the rotor 13 and the friction member 15. These figures illustrate the relative movement of a rotational center of the rotor 13, which typically does not move in the axial direction, using the position of the friction member 15, which moves during braking, as a point of origin. Note that the rotational center of the rotor 13 (not shown) is toward the bottom of the page. Furthermore, a state 13a in the figures shows a case in which there is no deflection between the rotor 13 and the friction member 15, indicating a state where the respective contact surfaces of the rotor 13 and the friction member 15 are mutually parallel while the rotor 13 is rotating.

However, deflection normally occurs between the rotor 13 and the friction member 15 (namely, a fluctuation in distance between the two objects over time). One type of deflection is the rotational vibration of the rotor 13 with respect to the contact surface of the friction member 15, using the contact surface as a reference.

As shown in FIG. 2A, in the case of rotational vibration, the contact surface of the rotor 13 oscillates between states 13b and 13b' with each rotation, thereby creating a deflection in the space between the rotor 13 and the friction member 15. Likewise, as shown in FIG. 2B, in the case where the friction member 15 gradually approaches the rotor 13 after initiation of braking, the contact surface of the rotor 13 oscillates between states 13c and 13c' with each rotation.

Specifically, this represents a transition from the states 13b and 13b' shown in FIG. 2A where the distance (relative displacement) between the friction member 15 and the rotor 13 is large when braking is initiated, to the states 13c and 13c' where the friction member 15 approaches the rotor 13 and eventually achieves a state of contact therewith.

At this time, the friction member 15 is subject to a reaction force that fluctuates over time due to contact with the rotor 13. Thus, the piston 12 pressing the friction member 15 and the electric motor 11 rotatably driving the piston 12 are also subject to a reaction force fluctuating over time, which leads to fluctuations in the rotational amount of the electric motor 11.

Figure 3A:
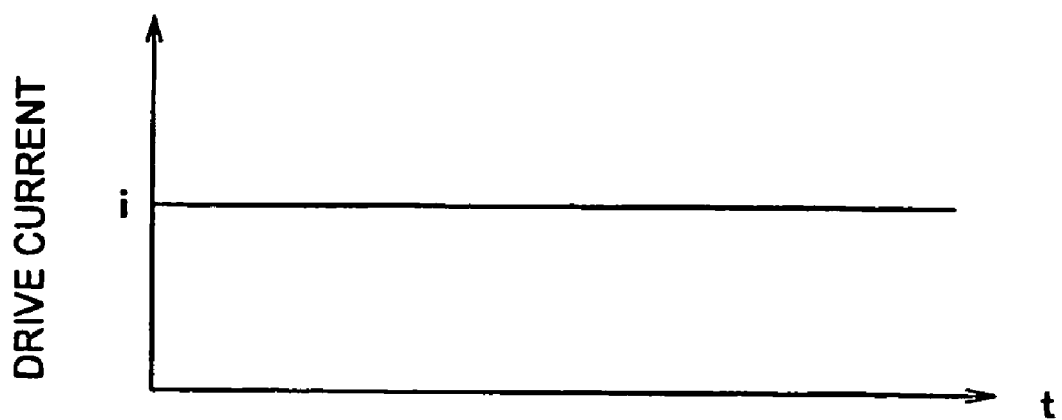
FIG. 3A is a time chart of a drive current of an electric motor.
Figure 3B:
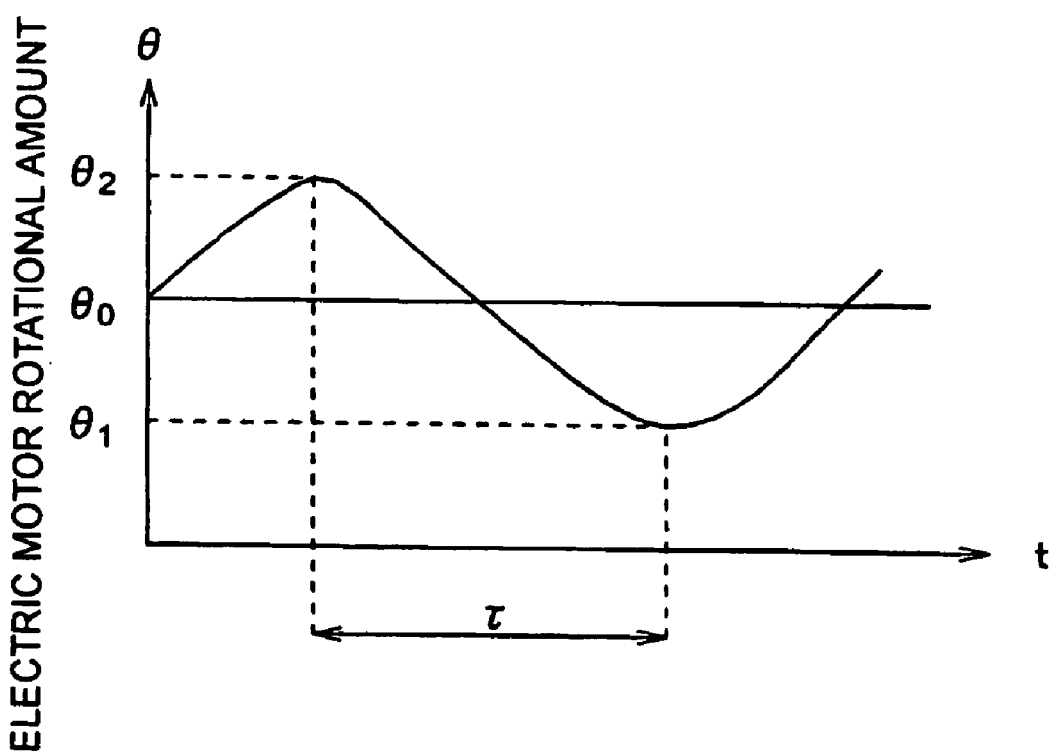
FIG. 3B is a time chart of a rotational amount of the electric motor.

Hence, as shown in FIGS. 3A and 3B, the brake ECU 19 calculates an average value $\theta_0$ at each predetermined time of the output signal from the resolver 18, and a minimum value $\theta_1$ and a maximum value $\theta_2$, within a predetermined time thereof when a drive current i of the electric motor is constant. Using a difference between the minimum and maximum values $(\theta_2-\theta_1)$, a rotation fluctuation amount $\Delta\theta$ is calculated.

In addition, an interval $\tau$ representing a time between the occurrence of the minimum value $\theta_1$ and the maximum value $\theta_2$ is calculated as a rotation fluctuation cycle.

Furthermore, the brake ECU 19 calculates a rotation cycle T of the rotor 13 using an output pulse of the wheel speed sensor 17.

Based upon the rotation fluctuation amount $\Delta\theta$ and rotation fluctuation cycle $\tau$ of the electric motor 11 and the rotation cycle T of the rotor 13 calculated in this manner, the brake ECU 19 serving as a vibration suppressing portion detects rotor vibration that causes brake noise.

Specifically, it is determined whether the rotation fluctuation amount $\Delta\theta$ of the electric motor 11 is greater than a set value $\delta$ as a first criterion, and it is further determined whether rotation fluctuation cycle $\tau$ of the electric motor 11 $\propto$ rotation cycle T of the rotor 13 as a second criterion.

The relative positions of the friction members 15 and 16, which are contacted with the rotor 13 because strongly vibrates, change with respect to the rotor 13. A rotational axis of the electric motor 11, which presses the friction members 15 and 16 toward the rotor 13, also moves back and forth in the pressing direction, thereby generating brake noise. The first criterion allows for the determination of brake noise caused in such a manner.

However, even if the first criterion is met, it is possible that the criterion was affected by other background noise and only fulfilled by chance.

The second criterion is set in order to eliminate such noise. Namely, in the case of brake noise due to the aforementioned cause, the rotation cycle of the rotor 13 calculated from the wheel speed is proportional to the rotation fluctuation cycle calculated from the rotational amount of the electric motor 11. Consequently, a presumption that rotation fluctuation of the electric motor 11 is caused by vibration of the rotor 13 can be determined as correct when the second criterion is met.

Therefore, cases in which the rotation fluctuation amount $\Delta\theta$ of the electric motor 11 only meets the first criterion due to background noise are eliminated by using the first criterion and the second criterion in combination, thus allowing for an accurate detection of brake noise.

Figure 4:
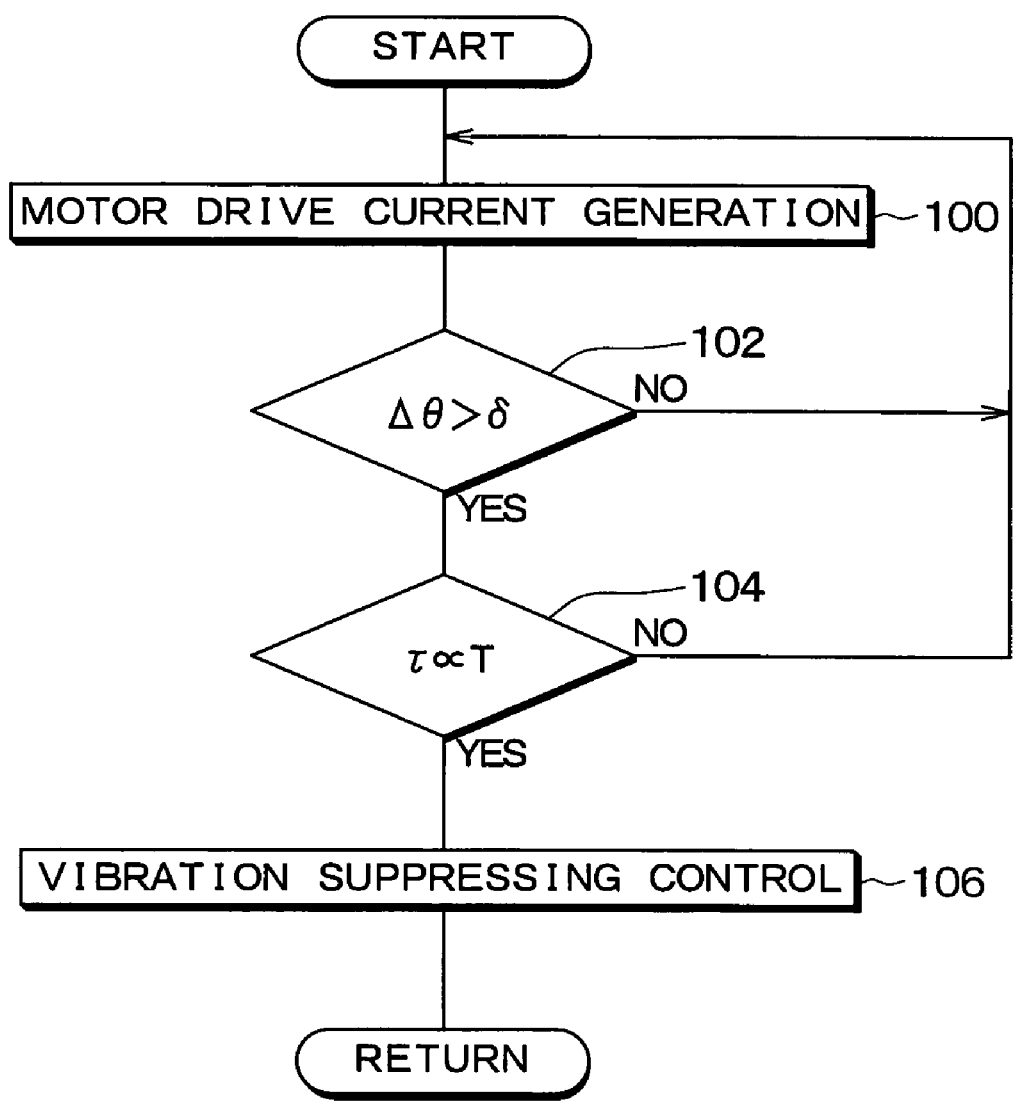
FIG. 4 is a flowchart of a computer program executed by a brake ECU.

Hereinafter, a process flow of a computer program executed by the brake ECU 19 for detecting and suppressing brake noise and abnormal vibration will be described with reference to FIG. 4.

At 100, the brake ECU 19 serving as a drive control portion supplies the drive current i to the electric motor 11 in accordance with a detection value of the depression force sensor 20. The electric motor 11 thus rotates at a rotational speed in accordance with the drive current i to move and press the friction members 15 and 16 onto the rotor 13, thereby generating a braking force on the wheel. At this time, the brake ECU 19 serving as a rotation fluctuation calculating portion calculates the rotation fluctuation amount $\Delta\theta$ and the rotation fluctuation cycle $\tau$ of the electric motor 11, and the rotation cycle T of the rotor 13.

At 102, it is determined whether the calculated rotation fluctuation amount $\Delta\theta$ is greater than the predetermined set value $\delta$. If the determination result is NO, the processing returns to processing at 100; if YES, the process shifts to processing at 104.

At 104, it is determined whether the calculated rotation fluctuation cycle $\tau$ of the electric motor 11 is proportional to the rotation cycle T of the rotor 13, that is, whether T/$\tau$=n, where n=an integer. If the determination result is NO, the processing returns to processing 100; if YES, it is determined that brake noise or abnormal vibration is occurring and the processing shifts to processing 106.

At 106, the brake ECU 19 serving as a vibration suppressing control portion temporarily changes the drive current i for the electric motor 11 with respect to a target value determined according to a brake depression force, for example, increasing or decreasing the actual drive current i with respect to the target value in order to increase or decrease the pressing force of the friction members 15 and 16 on the rotor 13 for a short period. Changing the amount of braking force generated, i.e., the pressing force of the friction members 15 and 16 on the rotor 13, is widely known to eliminate brake noise and the like.

Therefore, the pressing force at that time does not fall within the conditions for generating brake noise and abnormal vibration, thus allowing for the suppression of brake noise and abnormal vibration. Furthermore, since the change in braking force is temporary, it does not affect a braking force applied according to the intention of the driver.

While the above description is of the preferred embodiments of the present invention, it should be appreciated that the invention may be modified, altered, or varied without deviating from the scope and fair meaning of the following claims.

What is claimed is:

1. A vehicular braking apparatus comprising;
   friction members provided facing opposite a rotor integrally rotating with a wheel;
   an electric motor for rotatably interlocking with and moving a drive member that drives the friction members toward the rotor, and controlling a rotation of the wheel by pressing the friction members onto the rotor;
   a rotation detecting portion for detecting a rotational amount of the electric motor;
   a drive control portion for supplying a drive current to the electric motor depending on the rotational amount to rotatably operate the electric motor;
   a rotation fluctuation calculating portion for calculating a fluctuation amount of the rotational amount of the electric motor; and
   a vibration suppressing control portion for executing a vibration suppressing control when the rotation fluctuation amount exceeds a predetermined value.

2. The vehicular braking apparatus according to claim 1, further comprising a wheel speed sensor for detecting a wheel speed, wherein
   the rotation fluctuation calculating portion calculates a rotation fluctuation cycle of the electric motor and calculates a rotation cycle of the wheel based upon the wheel speed, and
   the vibration suppressing control portion executes the vibration suppressing control when the rotation fluctuation amount exceeds the predetermined value, and the rotation fluctuation cycle of the electric motor is proportional to the wheel rotation cycle.

3. The vehicular braking apparatus according to claim 1, wherein the vibration suppressing control portion temporarily changes the drive current from the drive control portion.

4. The vehicular braking apparatus according to claim 2, wherein the vibration suppressing control portion temporarily changes the drive current from the drive control portion.

5. A vehicular braking apparatus comprising;
   friction members provided facing opposite a rotor integrally rotating with a wheel;
   an electric motor for rotatably interlocking with and moving a drive member that drives the friction members toward the rotor, and controlling a rotation of the wheel by pressing the friction members onto the rotor;
   means for detecting a rotational amount of the electric motor;
   means for supplying a drive current to the electric motor depending on the rotational amount to rotatably operate the electric motor;
   means for calculating a fluctuation amount of the rotational amount of the electric motor; and
   means for executing a vibration suppressing control when the rotation fluctuation amount exceeds a predetermined value.

6. The vehicular braking apparatus according to claim 5, further comprising a wheel speed sensor for detecting a wheel speed, wherein
   the means for calculating a fluctuation amount of the rotational amount of the electric motor calculates a rotation fluctuation cycle of the electric motor and calculates a rotation cycle of the wheel based upon the wheel speed, and
   the means for executing a vibration suppressing control executes the vibration suppressing control when the rotation fluctuation amount exceeds the predetermined value and the rotation fluctuation cycle of the electric motor is proportional to the wheel rotation cycle.

7. The vehicular braking apparatus according to claim 5, wherein the means for executing a vibration suppressing control temporarily changes the drive current from the drive control portion.

8. The vehicular braking apparatus according to claim 6, wherein the means for executing a vibration suppressing control temporarily changes the drive current from the drive control portion.

9. A vehicular braking method for a vehicle in which friction members face a rotor, which integrally rotates with a wheel, and in which an electric motor rotatably interlocks with and moves a drive member that drives the friction members toward the rotor, the method comprising:
   controlling rotation of the wheel by pressing the friction members onto the rotor;
   detecting a rotational amount of the electric motor;
   supplying a drive current to the electric motor depending on the rotational amount to rotatably operate the electric motor;
   calculating a fluctuation amount of the rotational amount of the electric motor; and
   executing a vibration suppressing control when the rotation fluctuation amount exceeds a predetermined value.

10. The vehicular braking method according to claim 9, further comprising:
    detecting the speed of the wheel;
    calculating a rotation fluctuation cycle of the electric motor;
    calculating a rotation cycle of the wheel based upon the wheel speed; and
    executing the vibration suppressing control when the rotation fluctuation amount exceeds the predetermined value and the rotation fluctuation cycle of the electric motor is proportional to the wheel rotation cycle.

11. The vehicular braking method according to claim 9, wherein the vibration suppressing control includes temporarily changing the drive current.

12. The vehicular braking method according to claim 10, wherein the vibration suppressing control includes temporarily changing the drive current.

* * * * *